Figure 1:
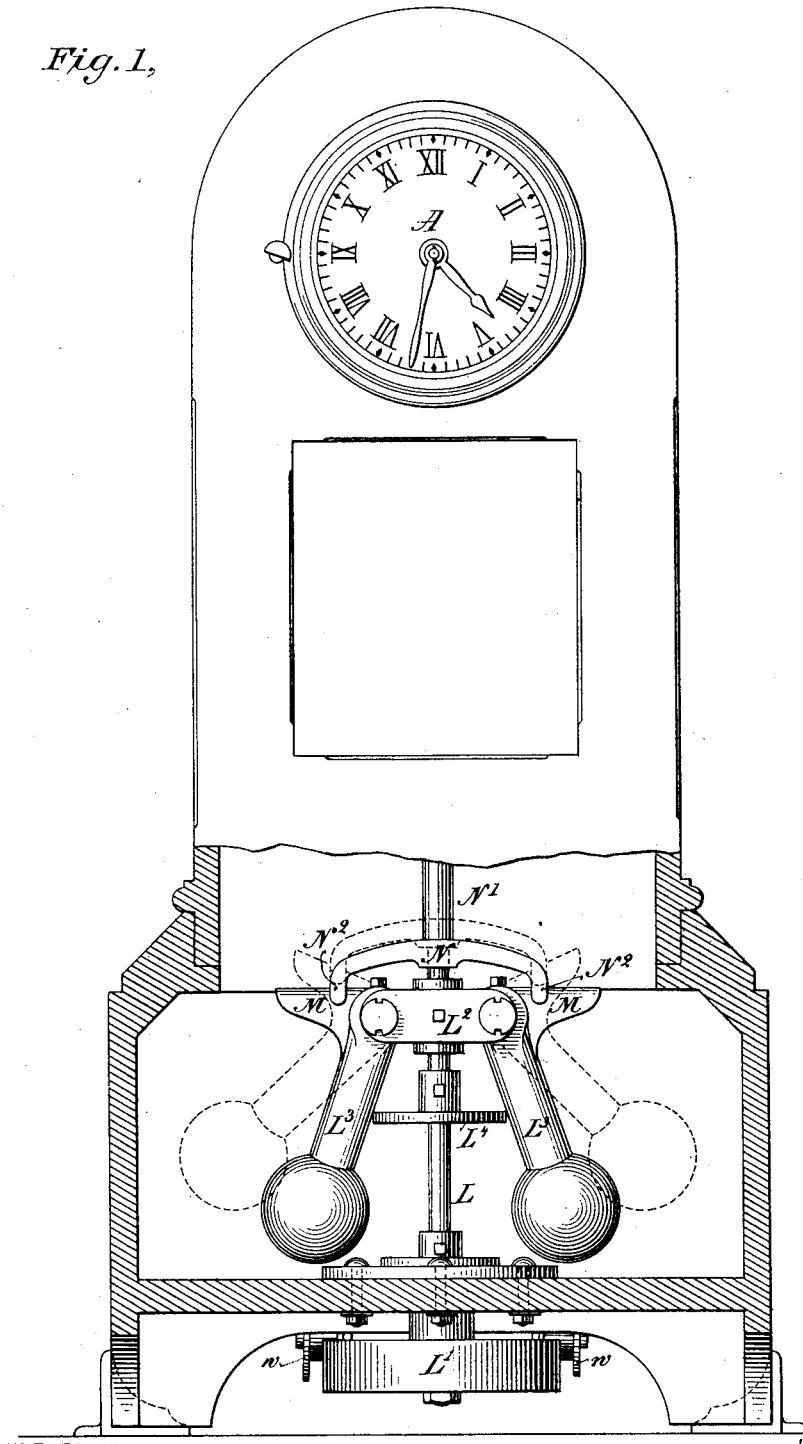

(No Model.)  4 Sheets—Sheet 1.

J. B. MOSCROP.
CONTINUOUS RECORDER.

No. 253,745.  Patented Feb. 14, 1882.

WITNESSES
Wm. A. Skinkle
Geo. W. Breck

INVENTOR
John Brown Moscrop
By his Attorney (No Model.)  
J. B. MOSCROP.  
CONTINUOUS RECORDER.  
No. 253,745. Patented Feb. 14, 1882.
4 Sheets—Sheet 2.
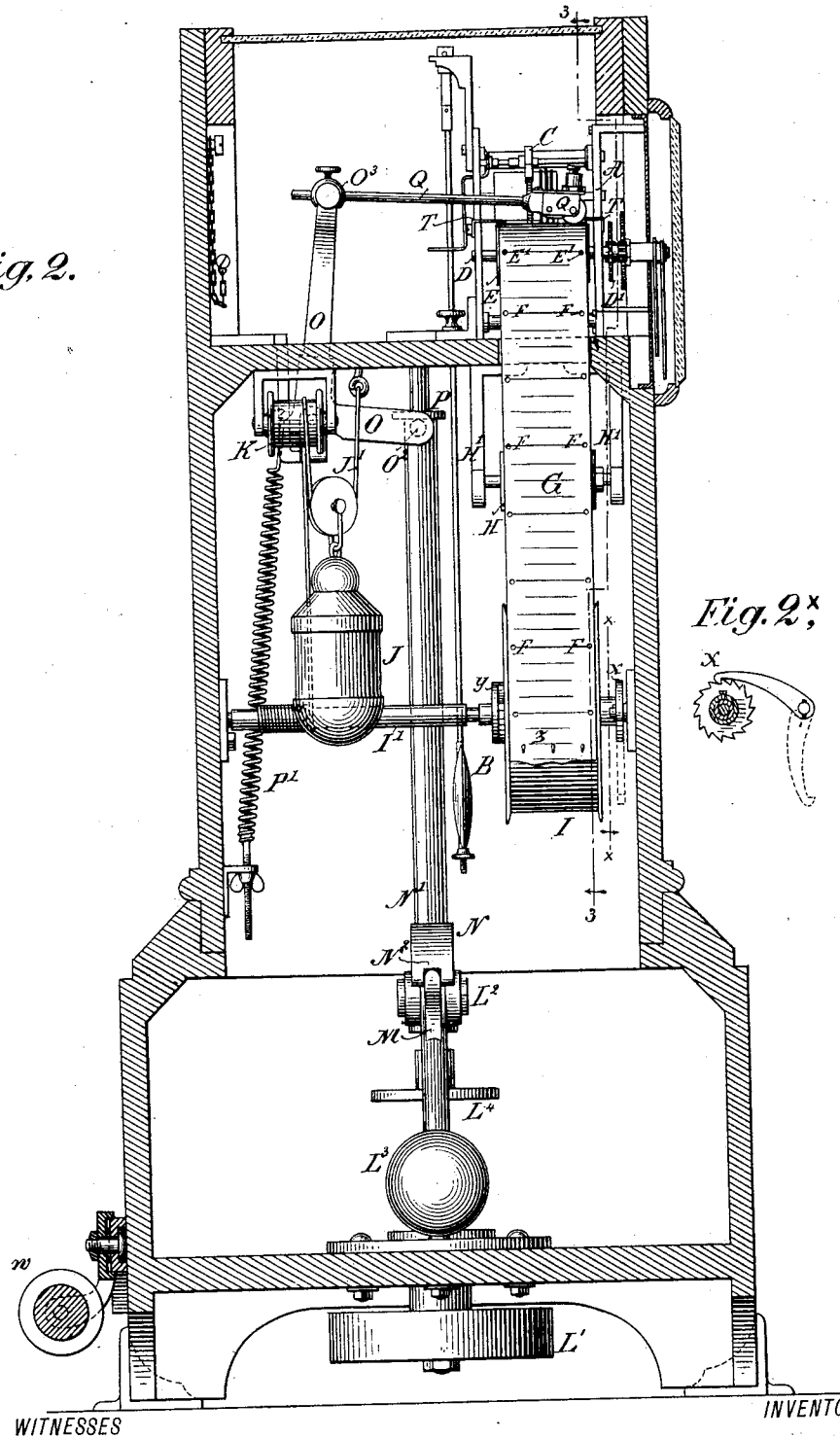
Fig. 2.
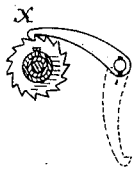
Fig. 2ˣ
WITNESSES  
INVENTOR  
John Brown Moscrop  
By his Attorney (No Model.) 4 Sheets—Sheet 3.
J. B. MOSCROP.
CONTINUOUS RECORDER.
No. 253,745. Patented Feb. 14, 1882.
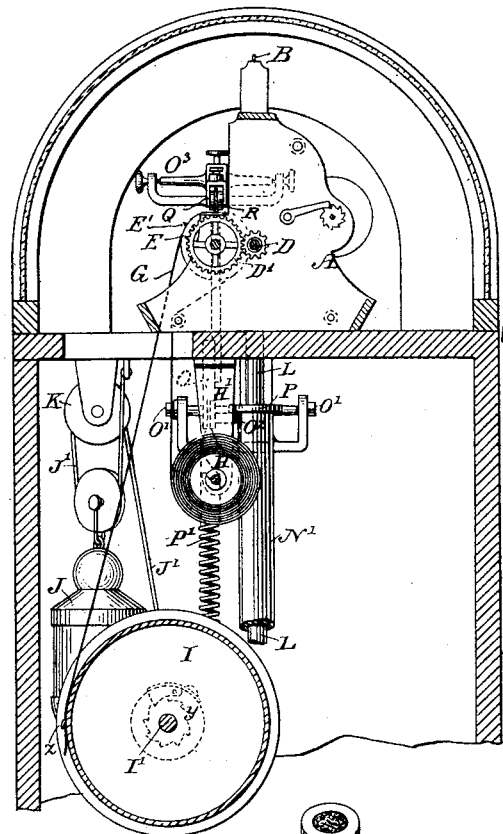
Fig. 3,
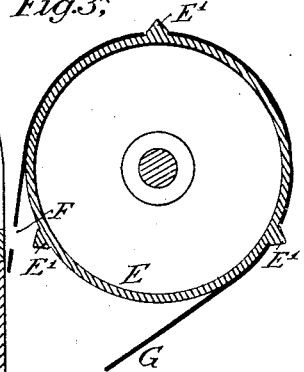
Fig. 3ˣ
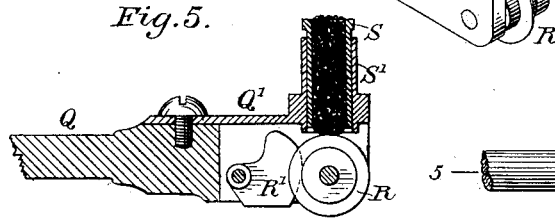
Fig. 4,
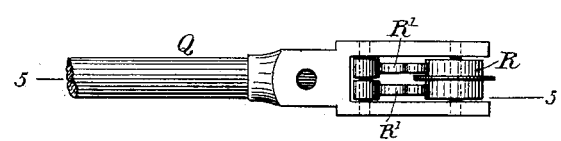
Fig. 5.  Fig. 6.
WITNESSES
Wm. A. Skinkle.
Geo. W. Breck.
INVENTOR
John Brown Moscrop.
By his Attorney
Jas. L. Ewin (No Model.)  4 Sheets—Sheet 4.
J. B. MOSCROP.
CONTINUOUS RECORDER.
No. 253,745.  Patented Feb. 14, 1882.
Fig. 7.
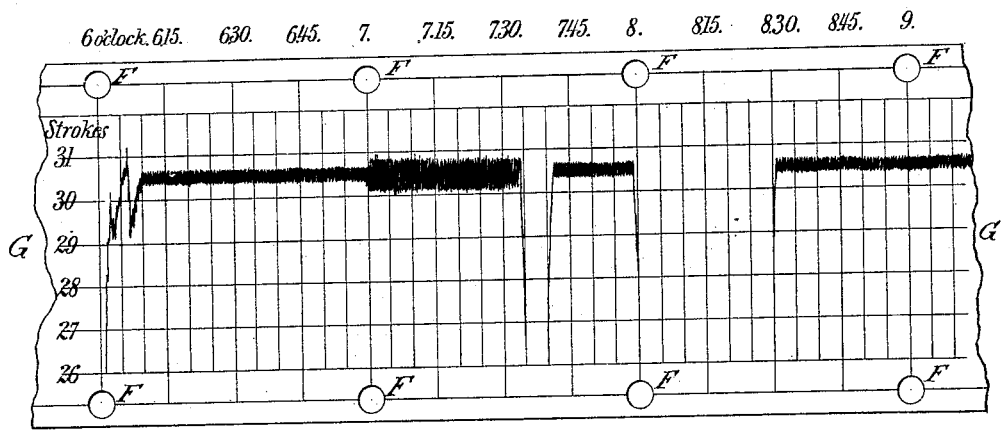
Fig. 7.ˣ
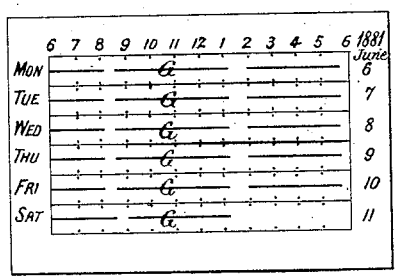
WITNESSES
Wm A. Skinkle
Geo. W. Breck
INVENTOR
John Brown Moscrop
By his Attorney

UNITED STATES PATENT OFFICE.

JOHN B. MOSCROP, OF STRETFORD, COUNTY OF LANCASTER, ENGLAND.

CONTINUOUS RECORDER.

SPECIFICATION forming part of Letters Patent No. 253,745, dated February 14, 1882.

Application filed January 14, 1882. (No model.) Patented in England March 24, 1881.

*To all whom it may concern:*

Be it known that I, JOHN BROWN MOSCROP, a subject of the Queen of Great Britain and Ireland, residing at Stretford, in the county of Lancaster, England, have invented a new and useful Improvement in Continuous Recorders, of which the following is a specification.

The present invention consists in several novel combinations of parts and an improved recording-marker, hereinafter specifically claimed, constituting together an improved apparatus for recording the performance of a steam-engine or other motor. This apparatus not only records the speed of the engine or motor, but every momentary fluctuation in speed or unsteadiness of motion and the time of its occurrence, besides showing the exact time of starting, the exact time of running, and the exact time of stopping. It is, moreover, adapted to so work automatically and continuously for a relatively long period of time as compared with other time-indicating recorders, and to record the aforesaid information in detail and with the utmost accuracy.

Figure 1 of the accompanying drawings is a front view of said apparatus with the lower part of the casing in section. Fig. 2 is a side elevation of the mechanism with the casing in vertical section, and Fig. $2^\times$ is a detail view of certain parts from the section-line $x$ $x$, Fig. 2. Fig. 3 is a vertical transverse section on the line 3 3, Fig. 2; and Fig. $3^\times$ is a detail section of certain parts in a parallel plane. Fig. 4 is a perspective view of the marker detached. Fig. 5 is a vertical longitudinal section of the same, and Fig. 6 is a plan view thereof with its cap-plate removed; and Figs. 7, $7^\times$ are face views of a fragment of the diagram, showing the style of record, and of a page of a record-book, showing a mode of preserving the record for comparison, Figs. 1 to 3 being drawn to one scale, Figs. $3^\times$ to 7 to a larger scale, and Fig. $7^\times$ to another small scale, and like letters of reference indicating corresponding parts in all the figures.

A, Figs. 1 to 3, represents an ordinary clock-movement controlled in the usual manner by a pendulum, B, and an anchor-escapement, C. (See Figs. 2, 3, and $3^\times$.) To any rotating part of this time mechanism, but by preference to the spindle D, which gives motion to the minute-hand of the clock, I connect a small drum, E, by spur-gearing D', so as to impart one-third of a rotation to said drum for every complete revolution of the minute-hand. The otherwise smooth periphery of this drum is provided with three equidistant pairs of stud-pins or pointed projections, E', Fig. $3^\times$, fitted to holes F in the longitudinal edges of a continuous diagram ribbon or tape, G, of suitably-ruled paper, and so located that one pair of said pins is at the top of the drum, which is the marking-point, at the beginning of each hour. The holes F serve, consequently, as hour-marks in the diagrams, and dispense with printing, the paper being suitably ruled with parallel transverse lines corresponding with the principal minor subdivisions of time—quarter-hours and five minutes—to adapt a detailed diagram to be read with facility as to time. Longitudinal lines equidistant from each other indicate the rate of speed in customary manner. (See Figs. 7 and $7^\times$.)

The roll of paper from which the tape G is taken is mounted, by means of a spindle, H, in hook-bearings H', so as to be readily renewed.

The tape, as drawn off by the drum E, is received by a spool or reel, I, to which a constant tendency to wind on the paper is given by a weight, J. This weight is suspended from a cord, J', the working end of which is attached to and wrapped around the shaft I' of said reel I. Said reel is provided on its periphery with a row of sharp teeth, $z$, for attaching the end of the paper tape thereto, and is mounted loosely on said shaft I', and connected therewith by pawl and ratchet, as shown at $y$, Fig. 3, to adapt said shaft to be turned backward independently to wind on more cord, when desired. A second pawl and ratchet (shown at $x$, Figs. 2, $2^\times$) acts as a detent for the reel in operation. The cord J' is wound on said shaft I', so as to re-elevate the weight J in the act of drawing the tape off the drum I. The detent-pawl $x$ is thrown back, as shown in dotted lines in Figs. 2, $2^\times$, to permit this motion. The effect of the said cord and weight, in connection with the parts before mentioned, is to keep the paper tape taut, which enables said pins E' on the drum E to engage truly with the successive pairs of holes F in said tape G, as shown in Fig. $3^\times$, thus aiding to cause said tape to be propelled by said drum at an absolutely uniform rate of speed, each given length of the paper tape corresponding with a definite length of time, and its subdivisions with those of the latter, as indicated by the clock. Said paper tape, so graduated and carried forward longitudinally, as aforesaid, receives the true record which it aids in obtaining, and the reading of which it facilitates by means of the remainder of the mechanism, which is illustrated more particularly by Figs. 1 and 2, with the aid of Figs. 4 to 6.

L, Figs. 1 and 2, represents a vertical shaft mounted in suitable bearings, and provided at its lower end with a band-pulley, L', which adapts said shaft to be connected by a driving-band with a pulley on any of the shafting driven by the steam-engine or other motor whose performance is to be recorded. A pair of adjustable guard-pulleys, $w$, Fig. 1, are attached by their centers to one edge of the casing of the recorder to aid in deflecting the driving-band to a horizontal path. Above said pulley L', within the casing of the recorder, said shaft L has thereon a cross-head, $L^2$, and a pair of weighted levers, $L^3$ $L^3$, are pivoted thereto, so as to hang downward when at rest, in which condition they rest against the edge of a stop-disk, $L^4$, on the shaft. A centrifugal governor is thus formed. To transmit motion therefrom the pivot ends of said weighted levers $L^3$ are constructed with ears or cams M having smooth upper surfaces, which may be tangential to the pivot-hubs, or suitably curved, and a gravitating vertical slide in the form of a cross-head, N, with a sleeve-extension, N', embraces said shaft L and rests, by means of the ends $N^2$ of said cross-head, upon said upper surfaces of said cams M. These bearing ends $N^2$ are downturned and notched so as to rest on said cams M at sharply-defined points in vertical planes equidistant from those of the pivots of said weighted levers $L^3$, and so as to keep said bearing ends on the respective cams. Lost motion between the governor-balls and the transmitting-slide N N' is thus precluded, and the latter is caused to rise and fall, not simply by changes in rate of speed, but by the most minute irregularities of unsteady driving, such as are usually seen only in their deleterious effects. Moreover, owing to the peculiar construction of said cams M and the location of said bearing-points $N^2$, the transmitted motion is so proportionated that a given change in the speed produces a corresponding transmitted movement of given length, whether the weighted levers $L^3$ be in their lowest or highest effective positions or at any intermediate point, the decreasing effect of centrifugal force being compensated for by the increasing leverage of said cams, and vice versa, as will be readily seen by an inspection of Fig. 1, in which said weighted levers are shown at different points of their fall and rise by full and dotted lines. Means for conveying said transmitted motion, with all its said characteristics, to the marker, and the preferred construction of the latter, are illustrated by Figs. 2 to 6.

O, Figs. 2 and 3, represents a bell-crank lever pivoted by pointed screw-centers O', and having at the extremity of a horizontal arm a pin, $O^2$, which projects beneath a circumferential flange, P, at the upper end of the sleeve N' of said transmitting-slide. Said pin is kept in contact with said flange by an adjustable spring, P', which is attached to another extremity of said lever O, and serves to partly counterbalance the weight of said transmitting-slide, so as to render it more sensitive. The main arm of said lever O extends upward and terminates in a pivot-coupling, $O^3$, of customary construction, with screw-centers, which connects it with the horizontal stock Q of my recording-marker, and adapts the latter to rest by gravity on the diagram ribbon or tape G upon the drum E, while it is reciprocated through said connections transversely of said tape, and causes the latter to show the most minute changes in steadiness of motion, as well as the rate of speed, and the exact time of starting, running, and stopping, as aforesaid.

A marking-wheel, R, Figs. 4 to 6, journaled within the front end of said stock Q, so as to rotate in the direction of reciprocation, is constructed with a peripheral flange as its marking-surface, and a pair of gravitating eccentrics, R', engage therewith on the respective sides of said flange, as detents to limit its motion to one direction. Being caused to rotate intermittently in this direction by contact with the tape, it carries down successive freshly-inked portions of its flange from contact with an inking-pad, S, to contact with the tape, while it is kept clean by the wiping action of the tape during the return movements of the marker.

The inking-pad S is composed of an open-ended tube packed with textile material, which is saturated with an aniline ink having an admixture of glycerine to keep it from evaporating. A drop of the ink is added from time to time, as paleness of the diagram may call for it. A holder, S', for this pad is attached to the cap-plate Q' of the marker, and the pad is adapted to be removed therefrom, as shown in Fig. 4, to facilitate replenishing it, while in operation the pad rests by gravity on the flange of the marking-wheel, as shown in Fig. 5.

The paper tape may be of any preferred width. It is preferably made only wide enough for recording the variations in speed that are likely to occur, and marker-rests T are provided above the paths of the pins E' to prevent contact of the marking-roller with these pins when the marker is moved beyond such limit, as in starting and stopping the engine or motor, in which event the roller mounts one or the other of said rests.

A fragment of used diagram bearing a characteristic record of the performance of a steam-engine as recorded by this apparatus is shown in fac-simile by Fig. 7, the same being part of a diagram so produced in a spinning-mill. Marginal figures indicate the invariable signification of the respective perforations and lines. This record shows that the engine commenced running at one minute past six o'clock and ran irregularly until seven and one-half minutes past. At ten minutes past it had fairly settled down to its work and ran thirty and one-half strokes moderately well until seven o'clock, the unsteadiness in speed here indicated being owing to the employment of spinning-mules. At seven o'clock the packing of the throttle-valve began to shift. It will be seen that the speed still was thirty and one-half strokes, and that the irregularities did not vary above half a stroke. No one could possibly discover by counting that the engine was not running as well as usual, but the record proves that it must have been running irregularly. At seven thirty-five the engine was stopped, and at seven forty was restarted, after easing the packing, and continued to run regularly until eight o'clock—the usual half-hour stop for breakfast. The continuous diagram may be allowed to accumulate on the receiving-reel for a week, or longer, without disturbing the operation of the apparatus, or the diagram belonging to each day may be torn off and conveniently pasted in a book for comparison, as illustrated by Fig. 7˟.

A door with a glass panel provides for reading the record as it is formed, and when locked secures the whole of the apparatus against being tampered with. When this door is unlocked the glass top of the casing and the glass face-plate of the clock may be opened. The means for securing these results, forming no part of my present invention, need not be more particularly described.

I claim as new and of my invention—

1. The combination, in a recording apparatus, substantially as herein specified, of a time mechanism, a rotary drum geared with said mechanism and provided with peripheral stud-pins arranged in equidistant pairs, and diagram-paper having corresponding holes to receive said pins, with a receiving-reel, to which said paper passes from said drum, and means for giving said reel a constant tendency to wind up said paper, for the purpose set forth.

2. The combination, in a recording apparatus, substantially as herein specified, of a time mechanism, a rotary drum geared with said mechanism and provided with peripheral stud-pins arranged in equidistant pairs corresponding with divisions of time, and diagram-paper having corresponding holes and parallel transverse lines marking minor subdivisions of time, for the purpose set forth.

3. In a recording apparatus, a marker comprising a marking-wheel, an inking-pad in contact with said wheel, and means for limiting the rotation of said wheel to one direction, substantially as herein specified, for the purpose set forth.

4. In a recording apparatus, a marker having a marking-wheel, an inking-pad in contact with said wheel, and means for limiting the rotation of said wheel to one direction, in combination with continuous diagram-paper supported beneath said marker and propelled longitudinally thereunder, and means for reciprocating said marker transversely of said paper, said marking-wheel being arranged to rotate in the line of reciprocation, substantially as herein specified, for the purpose set forth.

5. The combination, substantially as herein specified, of a time mechanism, continuous diagram-paper propelled longitudinally by said mechanism, a marker having a marking-wheel, an inking-pad in contact with said wheel, and means for limiting the rotation of said wheel to one direction, and adapted to reciprocate transversely of said paper, and mechanism for so moving said marker, for the purpose set forth 6. In an apparatus for recording the performance of a steam-engine or other motor, the combination of a time mechanism, continuous diagram-paper propelled longitudinally by said mechanism, a marker, adapted to reciprocate transversely of said paper, and mechanism for so moving said marker, comprising a centrifugal governor driven by said engine or motor, and constructed with ears or cams, a gravitating slide resting upon said cams, and a spring partly counterbalancing the weight of said slide through the medium of a connecting-lever, as means for transmitting proportionated motion to said marker, substantially as hereinbefore described and illustrated.

7. In an apparatus for recording the performance of a steam-engine or other motor, the combination of a time mechanism, continuous diagram-paper propelled longitudinally by said mechanism, a marker adapted to reciprocate transversely of said paper, and mechanism for so moving said marker, comprising a centrifugal governor driven by said engine or motor, and constructed with ears or cams, and a gravitating slide resting upon said cams and partly counterbalanced, as means for transmitting a steady proportionated motion from the governor-balls to said marker, substantially as hereinbefore described and illustrated.

JOHN BROWN MOSCROP.

Witnesses:
JOHN. G. WILSON,
JOHN ED. OLDHAM.